Figure 1:
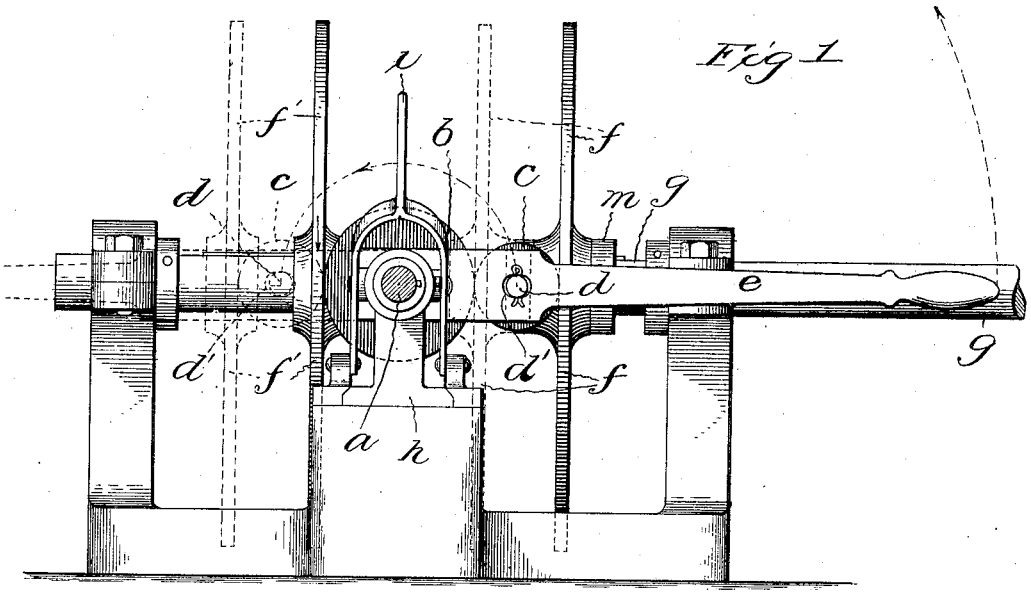

No. 827,564. PATENTED JULY 31, 1906.
A. S. REED.
REVERSING GEAR.
APPLICATION FILED JUNE 28, 1904.

2 SHEETS—SHEET 1.

Witnesses:
P. J. Caldwell
Irving Mac Donald

Inventor:
Albert S. Reed,
By Barton & Annes
Attys.

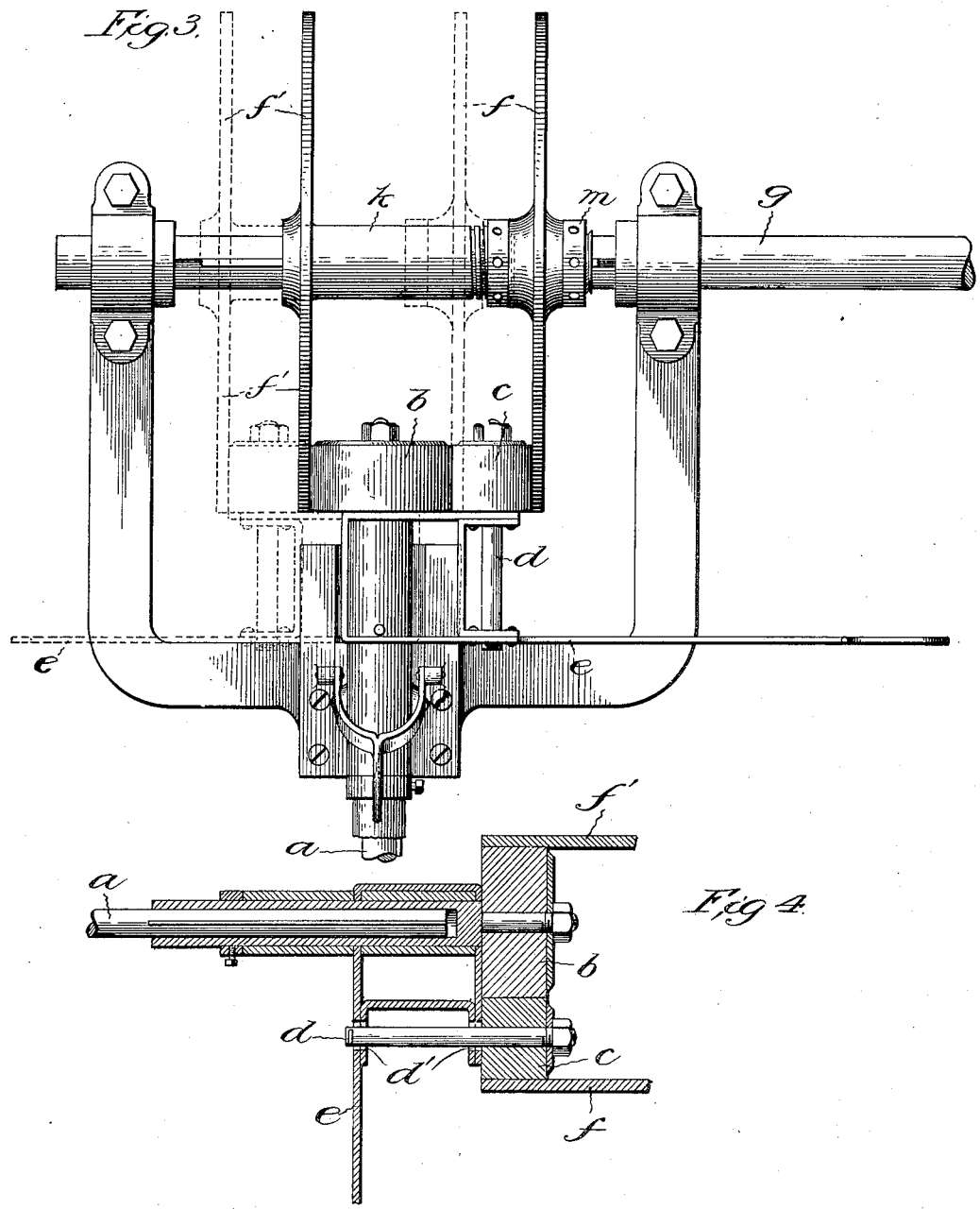

UNITED STATES PATENT OFFICE.

ALBERT S. REED, OF CHICAGO, ILLINOIS, ASSIGNOR OF ONE-HALF TO ELIJAH T. HARRIS, OF CHICAGO, ILLINOIS.

REVERSING-GEAR.

No. 827,564.  Specification of Letters Patent.  Patented July 31, 1906.

Application filed June 28, 1904. Serial No. 214,547.

*To all whom it may concern:*

Be it known that I, ALBERT S. REED, a citizen of the United States, residing at Chicago, in the county of Cook and State of Illinois, have invented a certain new and useful Improvement in Reversing-Gear, of which the following is a full, clear, concise, and exact description.

My invention relates to a gearing designed to transmit power from a driving-shaft to a shaft that is driven, and has especial reference to an arrangement such that the speed, and more particularly the direction of rotation, of the driven shaft will be under certain and easy control, while avoiding losses in efficiency of transmission due to lateral strains and end thrusts upon the shafts and bearings and the friction consequent thereon.

My invention is capable of wide application in power transmission, but is especially useful in those cases where the direction or speed of the driven shaft requires to be varied by an attendant, and as a general type of such gearing I may mention that used in connection with automobiles, gasolene-launches, engine-lathes, and in general all machinery characterized by more or less frequent reversal in operation.

Briefly stated, my invention comprises, first, an idler or supplementary friction-wheel driven directly by a main friction-wheel and arranged to press upon and drive one of a pair of friction-disks carried by the shaft to be driven while the main friction-wheel is acting on the other disk of the pair, thus rotating said shaft through the agency of both disks, which are driven in the same direction.

Second. My invention comprises lever mechanism for readily carrying the supplemental friction-wheel from one side of the main wheel to the other to interchange the engagement of the respective wheels with the disks, thereby reversing the direction of rotation and consequently that of the driven shaft or mechanism.

Third. My invention comprises a set of disks mounted on the driven shaft combined with the main and supplemental driving-wheels to engage therewith, said supplemental wheel being adapted to be shifted from one side to the other of the main wheel and at the same time to move the set of disks longitudinally.

Fourth. I provide not only for reversing the direction of movement of the driven shaft, but also for varying the rate of the speed thereof by changing the position of the engagement of the driving-wheels with the disks outwardly and inwardly from the shaft carrying the same, it being obvious that as the bearing of the wheels upon the disks is changed from the center outwardly their speed will be diminished.

Fifth. Another feature of my invention consists in means for adjusting the distance between the disks to compensate for wear upon the friction-wheels, so that a sufficient amount of pressure will be maintained thereon.

My invention will be more readily understood by reference to the accompanying drawings, in which—

Figure 2:
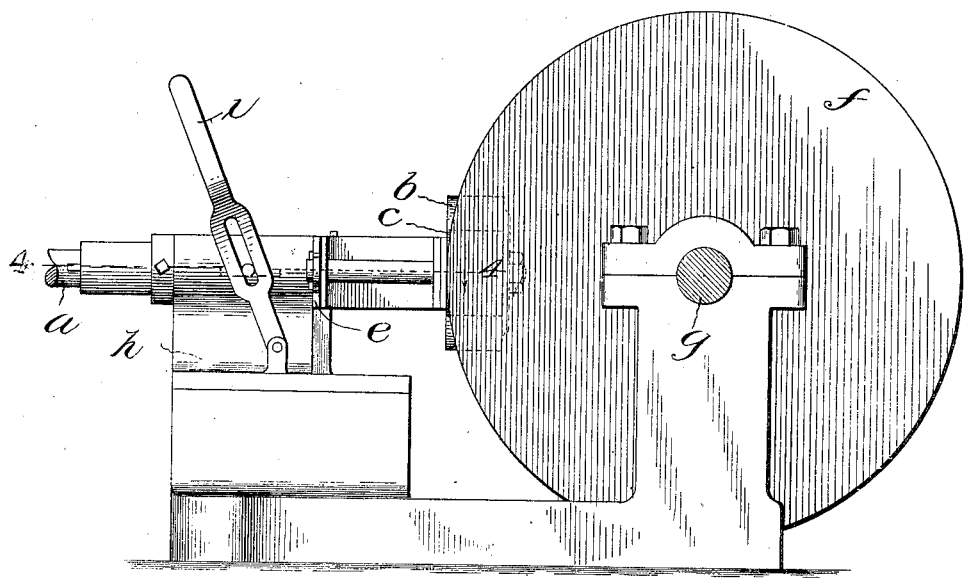

Figure 1 is a side elevation of the mechanism illustrative of my invention. Fig. 2 is an end view thereof. Fig. 3 is a plan view thereof, and Fig. 4 is a detail sectional view on line 4 4 of Fig. 2.

Like parts are indicated by similar letters of reference.

The shaft $a$, which is driven by any suitable motor, is provided with a friction-wheel $b$. The supplemental friction-wheel $c$ is supported upon a spindle $d$, which is provided with suitable loose bearings, as most clearly indicated at $d'$ $d'$ of Fig. 4. By means of the lever $e$ this supplemental friction-wheel may be carried from one side of the main friction-wheel to the other for the purpose of reversing the direction of rotation of the disks $f f'$, as shown most clearly in Figs. 1 and 3. This set of disks $f f'$ is mounted upon the driven shaft $g$. The disks $f f'$ in action work as a unit. They are splined to the shaft and adapted to be slid longitudinally thereon by the pressure exerted from the inside of one or the other of the same, as the case may be, when the supplemental friction-wheel $c$ is carried from one side of the main wheel to the other. The two positions of the disks and supplemental friction-wheel are indicated by the full lines and dotted lines in Figs. 1 and 3.

The friction-wheels and the lever $e$ are mounted together and associated with a sliding plate $h$ and adapted to be moved outwardly or inwardly by means of the lever $i$ to cause the friction-wheels to engage with the disks at a greater or less distance from the axis of revolution of the disks to control or vary the speed of the driven shaft relatively to the speed of the driving-shaft $a$.

The disk $f'$ is shown as integral with the hub or sleeve $k$, upon the end of which the disk $f$ is mounted, said disk $f$ being screwed upon the hub, as indicated, and held in position by a lock-nut $m$.

The friction-wheels may be of fiber, compressed rawhide, or other suitable material, and as they are worn down the disk $f$ is readily adjusted to compensate for such wear, so that the bearing is maintained upon the interior surfaces thereof. By this method of applying the power to the inside surfaces of both disks practically all thrust is taken off from the shaft $a$ as well as from the shaft $g$—that is to say, a balanced frictional engagement is obtained between the driving-shaft and the driven shaft.

It will be understood that where desired the power may be applied to the shaft which carries the disks in order to drive the other shaft carrying the friction-roller at an increased speed, and the terms "driving-shaft" and "driven shaft" where used in the claims will be taken merely as a means of designating the shafts $a$ and $g$, respectively, whether used in one way or the other.

I claim—

1. The combination with a driven shaft, of a hub mounted upon said shaft, a pair of disks mounted upon said hub, one of said disks being mounted adjustably upon the hub, whereby the distance between said disks may be varied, a lock-nut screwing upon said hub for fastening the adjustable disk, and driving-wheels engaging the inner faces of said disks.

2. The combination with a driven shaft, of a pair of friction-disks $f$ $f'$ mounted a short distance apart upon a common hub, said hub being splined to said driven shaft to move longitudinally thereon while rotating therewith, one of said disks being adjustably mounted upon said hub, means for locking said disk in its adjusted position, of a driving-shaft at a right angle to said driven shaft, a driving friction-roller lying between said disks and adapted to engage and drive either of them according to the relative position of their common hub upon the driven shaft, a supplemental friction-roller mounted to rotate upon a spindle, and a mounting for said spindle adapted to swing around the driving-shaft as an axis, whereby the supplemental roller may swing into engagement with either disk to drive the same and to move the pair of disks longitudinally to press the other disk into engagement with the main driving-roller.

In witness whereof I hereunto subscribe my name this 20th day of June, A. D. 1904.

ALBERT S. REED.

Witnesses:
De Witt C. Tanner,
Geo. C. Davison.